United States Patent [19]

Noble

[11] Patent Number: 5,031,863

[45] Date of Patent: Jul. 16, 1991

[54] UPWARD/OUTWARD OPENING, PLUG-TYPE OVERWING EMERGENCY EXIT HATCH

[75] Inventor: Donald R. Noble, Issaquah, Wash.

[73] Assignee: The Boeing Company, Seattle, Wash.

[21] Appl. No.: 454,686

[22] Filed: Dec. 21, 1989

[51] Int. Cl.$^5$ ............................................. B64C 1/14
[52] U.S. Cl. ................................. 244/129.5; 49/249
[58] Field of Search ..................... 244/129.5, 137.1; 49/248, 254, 379, 340, 249, 37, 30

[56] References Cited

U.S. PATENT DOCUMENTS

| | | | |
|---|---|---|---|
| 2,748,855 | 6/1956 | Siems et al. | 49/379 |
| 4,473,201 | 9/1984 | Barnes et al. | 244/129.5 |
| 4,497,462 | 2/1985 | Hamatani | 244/129.5 |
| 4,510,714 | 4/1985 | Kasper et al. | 49/249 |
| 4,560,123 | 12/1985 | Sealey et al. | 244/129.5 |

Primary Examiner—Joseph F. Peters, Jr.
Assistant Examiner—Anne E. Bidwell
Attorney, Agent, or Firm—Christensen, O'Connor, Johnson & Kindness

[57] ABSTRACT

A hatch assembly for closing an overwing emergency exit opening formed in the body of an aircraft. The hatch (10) includes a plug-type hatch frame (24) and a pair of hinge arms (36) providing swinging movement of the hatch between a closed position and a fully open position that is spaced above and outboard of an opening (12) in the body (14) of an aircraft. Triggering movement of either an internal handle (62) or an external (106) disengages a latch (126) operable when the hatch is in the closed position, thereby placing the hatch in an unlatched condition. Further movement of either handle causes a pair of compression springs (50) coupled to the hinge arms to automatically drive the hatch slightly inward and upward from the closed position to an intermediate lifted position to clear a stop mechanism (32 and 34), and then outward to the open position. Because the components of the hatch are located substantially within the space between an outer skin (18) of the aircraft and an interior cabin liner (20), the passenger headroom area and the overhead storage bins (22) are not violated.

13 Claims, 10 Drawing Sheets

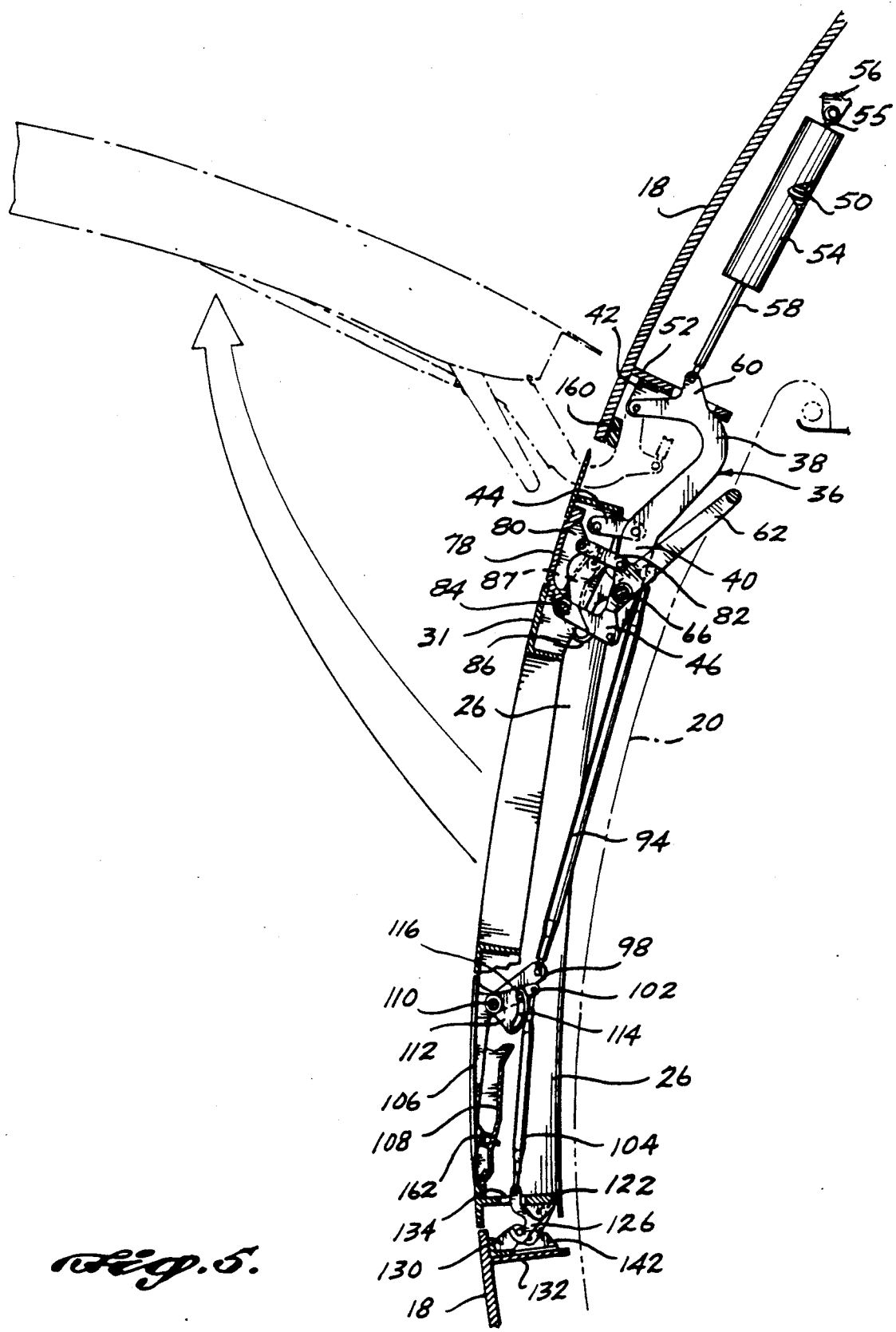

UPWARD/OUTWARD OPENING, PLUG-TYPE OVERWING EMERGENCY EXIT HATCH

TECHNICAL FIELD

This invention relates to hatches for egress from transport vehicles such as aircraft and, more particularly, to an upwardly and outwardly opening, plug-type emergency exit hatch located over the wing of an aircraft.

BACKGROUND OF THE INVENTION

Overwing emergency exit systems on existing commercial aircraft normally include a plug-type hatch requiring the operation of a single handle to unlatch the hatch. The hatch must then be manually lifted out of its location in the body structure and either placed inside the aircraft or thrown out through the body opening.

Automatically powered systems for opening doors to the exterior of aircraft are known in the art. For example, see the systems disclosed in U.S. Pat. No. 4,497,462 issued to Hamatani on Feb. 5, 1985, and in U.S. Pat. No. 4,510,714 issued to Kasper et al. on Apr. 16, 1985. However, such systems are not applicable to overwing emergency exit hatches because their powering and linkage mechanisms can intrude into the passenger headroom area or overhead bin storage area. In an overwing emergency exit hatch application, this means the powering and linkage mechanisms must substantially fit within the envelope between the outer skin of the aircraft and the interior cabin liner or storage bins. Additionally, the powering and linkage mechanisms should be configured to allow a standard-sized window to be placed in the central region of the hatch, since uniformity of appearance is greatly desired by aircraft customers.

As a result, there has been a long-felt need for an overwing emergency exit hatch that: automatically opens after being unlatched, thus eliminating manual handling and disposition of the hatch; does not violate passenger headroom or overhead storage bin area; and allows the installation of a standard-sized window. This invention is directed to satisfying this need.

SUMMARY OF THE INVENTION

A hatch assembly for closing an opening formed in the body of an aircraft is disclosed. The hatch assembly includes a hatch and a hinge means for pivotally attaching the hatch to the body of the aircraft. The hinge means provides swinging movement of the hatch between a first position, in which the hatch lies within the opening, and a second position, in which the hatch is spaced above and outboard of the opening. A drive means is coupled in driving relationship to the hinge means for driving the hatch slightly inward and upward from the first position to an intermediate lifted position to clear a stop means, and then outward to the second position. A latch means is associated with the hatch and the aircraft that is operable when the hatch is in the first position to place the hatch in a latched condition, in which movement of the hatch from the first position is prevented. An actuation means is operably coupled to the latch means so that triggering movement of the actuation means disengages the latch means to place the hatch in an unlatched condition. The actuation means is also operably coupled to the drive means so that further movement of the actuation means engages the drive means to provide movement of the hatch to the intermediate and second positions. Preferably, the components of the hatch assembly are disposed substantially within a space defined by an outer skin of the aircraft and an interior cabin liner.

BRIEF DESCRIPTION OF THE DRAWINGS

The foregoing and other features and advantages of the present invention will become more readily appreciated as the same becomes better understood by reference to the following detailed description of the preferred embodiment of the invention when taken in conjunction with the accompanying drawings, wherein:

FIG. 5 is a partial cross-sectional side view of the hatch shown in FIG. 2;

DETAILED DESCRIPTION OF THE PREFERRED EMBODIMENT

Figure 1:
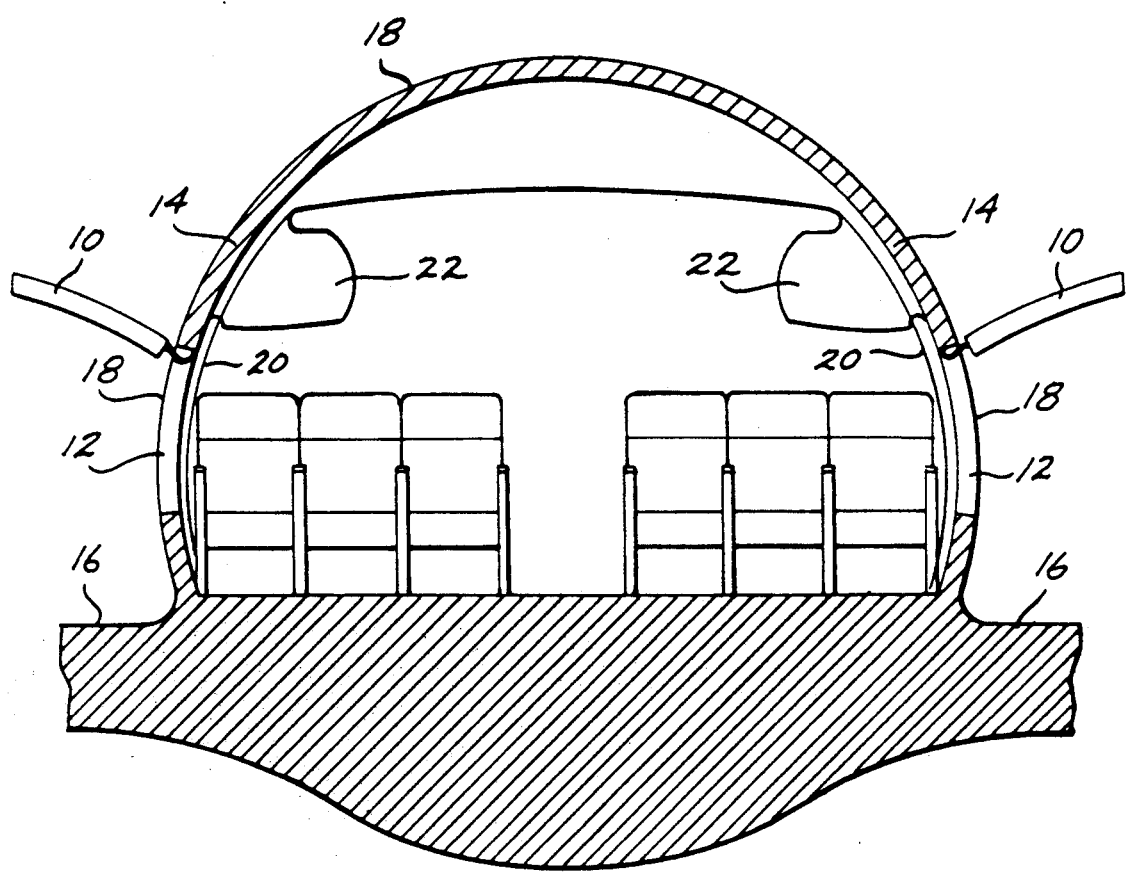
FIG. 1 is a cross-sectional elevational view of an overwing section of an aircraft utilizing a pair of hatches made in accordance with the principles of the present invention.

One embodiment of a hatch 10, adapted for use as an emergency exit in the overwing section of a commercial airliner and made in accordance with the principles of the present invention, is environmentally pictured in FIG. 1. The hatch 10 is shown in an open position, spaced above and outboard of an opening 12 in an aircraft body 14. As illustrated, an opening 12, and a corresponding hatch 10, are disposed over each wing 16 of the aircraft. With the hatch 10 held in the illustrated canopy orientation, the passengers are permitted egress from the aircraft. As will be described in greater detail below, the mechanism that provides movement of the hatch 10, and the hatch itself, are located substantially within the space between an outer skin 18 of the aircraft and an interior cabin liner 20 when the hatch is in a closed position. As a result, the mechanism providing movement of the hatch 10 does not violate the passenger headroom area or the overhead storage bins 22.

Referring to FIGS. 2, 3, 4, and 5, the hatch 10 is of plug-type design, having a hatch frame 24 configured to snugly fit within the opening 12 of the aircraft. The hatch frame 24 has a depth approximately equal to the thickness of the body 14 of the aircraft, the depth being defined by a peripheral flange 26 establishing the perimeter of the frame. An outer lip 28 and an inner lip 30 extend orthoganally outward from the outer and inner edges of the peripheral flange 26, respectively. The peripheral flange 26 and the outer lip 28 have a curvature that allows the hatch frame 24 to blend with the curvature of the outer skin 18 of the aircraft. Hatch frame 24 also includes a solid outboard wall 31 and a lattice structure internal to peripheral flange 26, the lattice structure serving to increase the structural integrity of the hatch frame and to provide supports to which hatch components can be mounted. Although not illustrated, a conventional sealing member is disposed about the periphery of outer lip 28 of hatch frame 24 in order to maintain an airtight seal between the interior and the exterior of the aircraft.

The pressure on the inboard surface of the hatch 10 is normally greater than that on the outboard surface because of internal cabin pressurization employed during flight. As a result, a stop mechanism is employed so that the plug-type hatch 10 is not expelled outwardly through the opening 12 in the aircraft. This stop mechanism includes four stop pins 32 and four stop pads 34. Two stop pins 32 are mounted to each side of the hatch frame 24 at spaced locations along the peripheral flange 26. Mounted to the sides of opening 12, directly adjacent stop pins 32, are stop pads 34. The stop pins are arms designed to cooperatively rest against the stop pads to prevent outboard movement of the hatch 10. Both stop pins 32 and stop pads 34 have baseplates to assist in mounting. To promote clarity, only three stop pin and stop pad combinations have been shown in FIG. 2.

Upward and outward swinging movement of the hatch 10 is provided by a pair of hinge arms 36, each hinge arm including an arcuate portion 38 and a substantially linear base portion 40. Each hinge arm 36 is pivotally mounted to the body 14 of the aircraft, at the end of its arcuate portion 38 located distal from the base portion 40, by a mounting bracket 42. Each hinge arm is also translationally attached to the hatch 10 via an upper lifting link 44 and a lower lifting link 46. Upper lifting link 44 is pivotally attached at one end to a mounting box 48, which is mounted to, or integral with, the hatch frame 24. The other end of upper lifting link 44 is pivotally attached to hinge arm 36 at the end of base portion 40 located nearest the arcuate portion 38. Lower lifting link 46 is essentially pivotally attached (actual manner of attachment described below) at one end to mounting box 48, and is pivotally attached at the other end to hinge arm 36 at the end of base portion 40 located distal from the arcuate portion 38.

The driving force for movement of hinge arms 36 is provided by a pair of compression springs 50, which are disposed above an upper sill 52 of opening 12. A protective housing 54 that surrounds each compression spring has an upwardly extending mounting extension 55 pivotally mounted to any suitable structural member of the aircraft by a mounting bracket 56. The end of compression spring 50 located nearest the hatch frame 24 is secured to one end of a rod 58 at a position inside protective housing 54. Rod 58 is pivotally mounted at its other end to a protuberance 60 located along the arcuate portion 38 of hinge arm 36 and extending through an opening in upper sill 52. The opening around protuberance 60 is such that the protuberance is provided adequate clearance when hinge arm 36 pivots during the upward and outward movement of hatch 10.

Movement of the hatch 10 of the present invention is provided via actuation of an internal handle 62. Internal handle 62 is fixedly mounted through a pair of collars 64 to an upper torque tube 66 at locations slightly inside hinge arms 36. Thus, any rotation of internal handle 62 causes upper torque tube 66 to also rotate. Each collar 64 has a downwardly extending arm 68 that rests upon a support 70 to keep internal handle 62 static during its nonactuation mode. Support 70 is integral with lower lifting link 46, emerging orthogonally outward from approximately the midpoint of the lower lifting link, turning approximately ninety degrees, and extending in a direction spaced from and parallel to lower lifting link 46. The support terminates at a point corresponding to the end of lower lifting link 46 pivotally attached to hinge arm 36. In order to maintain its integral nature with lower lifting link 46, support 70 is also pivotally attached to hinge arm 36.

Figure 2:
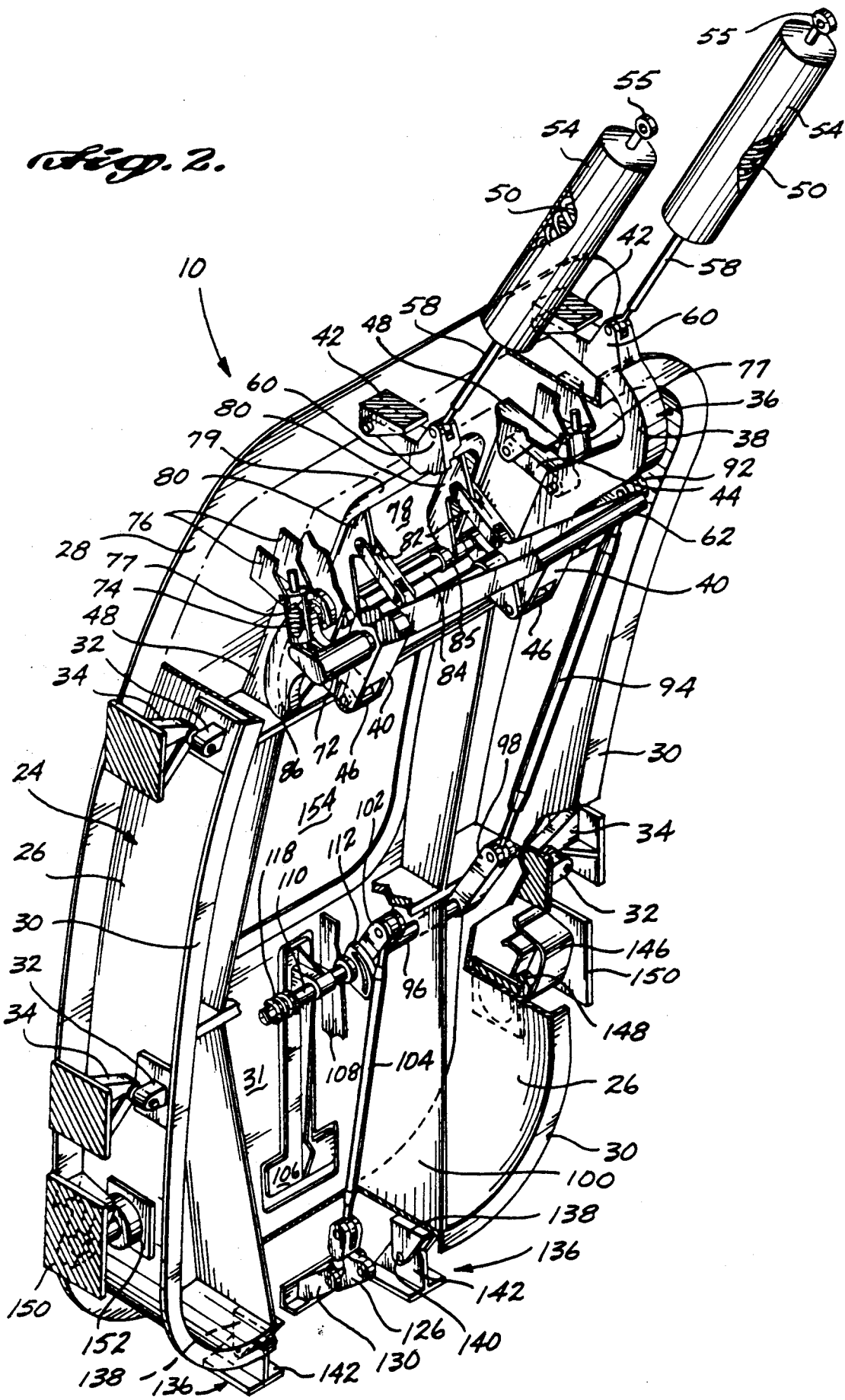
FIG. 2 is a partially cut-away isometric view of the hatch of the present invention, viewed from a position inside the aircraft.
Figure 3:
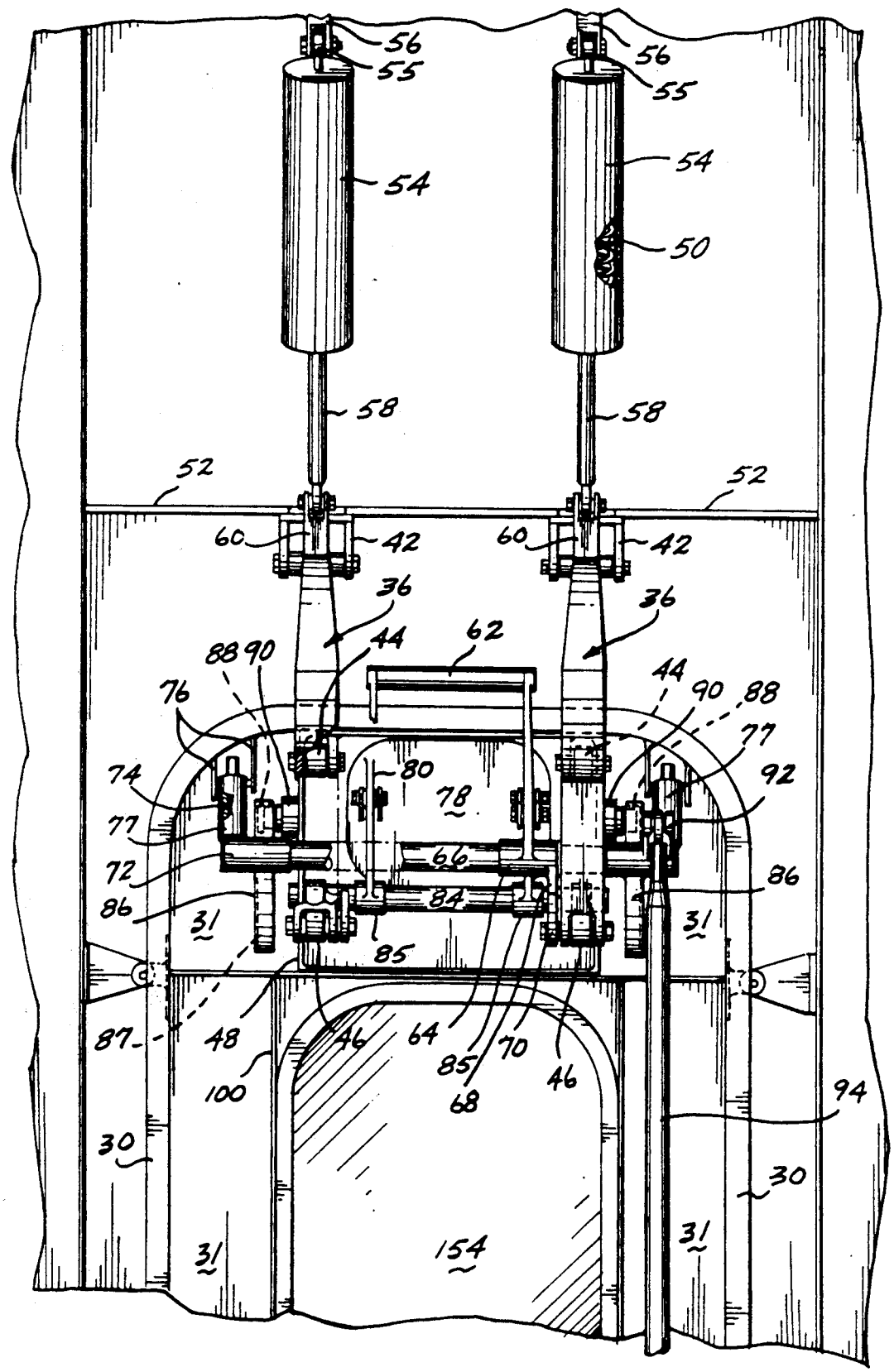
FIG. 3 is an elevational front view of the upper portion of the hatch shown in FIG. 2, partially cut away to more clearly show details of the hatch components.

Upper torque tube 66 extends beyond collars 64 through openings in hinge arms 36, and terminates at positions beyond the hinge arms. While not shown, conventional bearing assemblies may be employed to allow upper torque tube 66 to properly rotate within hinge arms 36. Over the terminal ends of upper torque tube 66 are mounted a pair of caps 72, each cap being connected to a compression spring 74 mounted to hatch frame 24 by a mounting bracket 76. A protective housing 77 surrounds each compression spring 74, as shown in FIGS. 2 and 3. Because spring 74 is a compression spring, caps 72 are rotationally biased in a direction that maintains internal handle 62 in its upright position. In this way, no loose rattling of the internal handle can occur. However, the force of the compression springs 74 is not great enough to prevent actuation of internal handle 62.

Internal handle 62 is also connected to a pressure relief vent 78, which covers an opening formed in outboard wall 31 of hatch frame 24. Pressure relief vent 78 has a seal member 79 extending about its perimeter, the seal member being formed of a resilient yet elastomeric material such that both extended use and an efficient seal are provided. On the inside surface of the pressure relief vent, a pair of orthogonally extending flanges 80 are mounted. One end of each flange 80 is coupled via a link 82 to internal handle 62. The other end of each flange is fixedly mounted on a lower torque tube 84 through a circular mount 85 integral with the flange. The lower torque tube 84 is rotatably mounted within the mounting box 48, as described in the following paragraph. With this configuration, initial actuation of internal handle 62 pulls the upper portion of pressure relief vent 78 back away from outboard wall 31 of hatch frame 24, thereby providing the passageway between the interior and the exterior of the aircraft necessary to obtain pressure equalization. The lower portion of pressure vent 78 remains substantially in place, simply rotating with lower torque tube 84.

The lower torque tube 84 extends beyond circular mounts 85 through openings in mounting box 48, and terminates just beyond the mounting box. Just inside the mounting box 48, one end of each lower lifting link 46 is also fixedly mounted on lower torque tube 84. Because the lower torque tube is rotatable within the mounting box 48, the end of the lower lifting link 46 has, in effect, been pivotally mounted to the mounting box. While not shown, conventional bearing assemblies may be employed to allow the lower torque tube to properly rotate within the mounting box.

A pair of lifting cams 86 are located between the mounting box 48 and the springs 74. Each lifting cam 86 is integral with cap 72 and has a kidney-shaped channel 87, in which a roller 88 travels. Roller 88 is rotatably mounted via a support 90 to the outside surface of mounting box 48 at a location that allows the roller to travel in the channel 87 of lifting cam 86 as internal handle 62 is actuated.

One of the caps 72 (the right one when viewed from a position inside the aircraft) has an integral crank 92 pivotally mounted to a pushrod 94. Thus, actuation of internal handle 62 causes rotation of cap 72, and corresponding rotation of crank 92, which causes the downward motion of pushrod 94 necessary to disengage the latch mechanism (described in detail below) located at the bottom of hatch 10.

The downward motion of pushrod 94 is converted to rotational motion of a shaft 96 through a crank 98, the crank being pivotally attached to pushrod 94 and fixedly attached to shaft 96. While not shown, a conventional bearing assembly may be employed where shaft 96 passes through an intercostal 100, which makes up part of the lattice structure of hatch frame 24. The terminal end of shaft 96 located distal from crank 98 has a crank 102 fixedly attached. A pushrod 104 is pivotally attached on one end to crank 102 and is attached on the other end to the latch mechanism (described below). Thus, the rotational movement of shaft 96 is converted to the downward movement of pushrod 104 required to disengage the latch mechanism.

Movement of the hatch 10 of the present invention may also be accomplished through actuation of an external handle 106. A housing 108 (see FIGS. 4 and 5) serves to isolate external handle 106 from the interior of the airplane and, thereby, from the other components that make up hatch 10. External handle 106 is fixedly mounted to a shaft 110, such that rotation of the external handle directly results in rotation of the shaft. Because shaft 110 passes through apertures in housing 108, the housing acts as a support for the shaft rotatably mounted therein. While not shown, bearing assemblies may be placed at positions where the shaft 110 passes through housing 108 to allow for proper rotation of the shaft.

A lost motion device 112 is fixedly attached to the end of shaft 110 located nearest crank 102. Lost motion device 112 has a channel 114 passing completely through it that is sized to receive a pin 116 extending outwardly from crank 102. When internal handle 62 and external handle 106 are in their nonactuated positions, pin 116 rests against the upper terminal end of channel 114, as shown in FIG. 5.

When internal handle 62 is actuated, shaft 96 and crank 102 rotate to provide the downward motion of pushrod 104 necessary to unlatch hatch 10. As this rotation of shaft 96 and crank 102 occurs, pin 116 passes along channel 114. Channel 114 is of a length that allows full rotation of shaft 96 and crank 102 without pin 116 reaching the other terminal end of the channel. Thus, lost motion device 112 allows hatch 10 to operate through the actuation of internal handle 62 without any subsequent effect upon external handle 106.

Conversely, actuation of external handle 106 has a direct effect upon internal handle 62 and related components located in the upper portion of hatch frame 24. Because pin 116 is located at the terminal end of channel 114 when external handle 106 is not actuated, any actuation of the external handle causes the terminal end of channel 114 to bear against pin 116, which is attached to crank 102. Therefore, as external handle 106 is actuated, crank 102 is rotated to provide the downward movement of pushrod 104 necessary to unlatch hatch 10. Simultaneously, rotation of shaft 96, acting through crank 98, causes a downward movement of pushrod 94. This downward movement is translated through crank 92 into rotational movement of upper torque tube 66, which in turn causes internal handle 62 to rotate in an inboard and downward direction, thereby releasing pressure relief vent 78. In summary, hatch 10 is fully operational through actuation of either internal handle 62 or external handle 106.

A helical torsion spring 118 is located at the end of shaft 110 opposite lost motion device 112 to bias external handle 106 into a closed, or nonactuated, position. Helical torsion spring 118 is mounted at one end to shaft 110 and at the other end to housing 108 through a pair of mounts 120.

Figure 4:
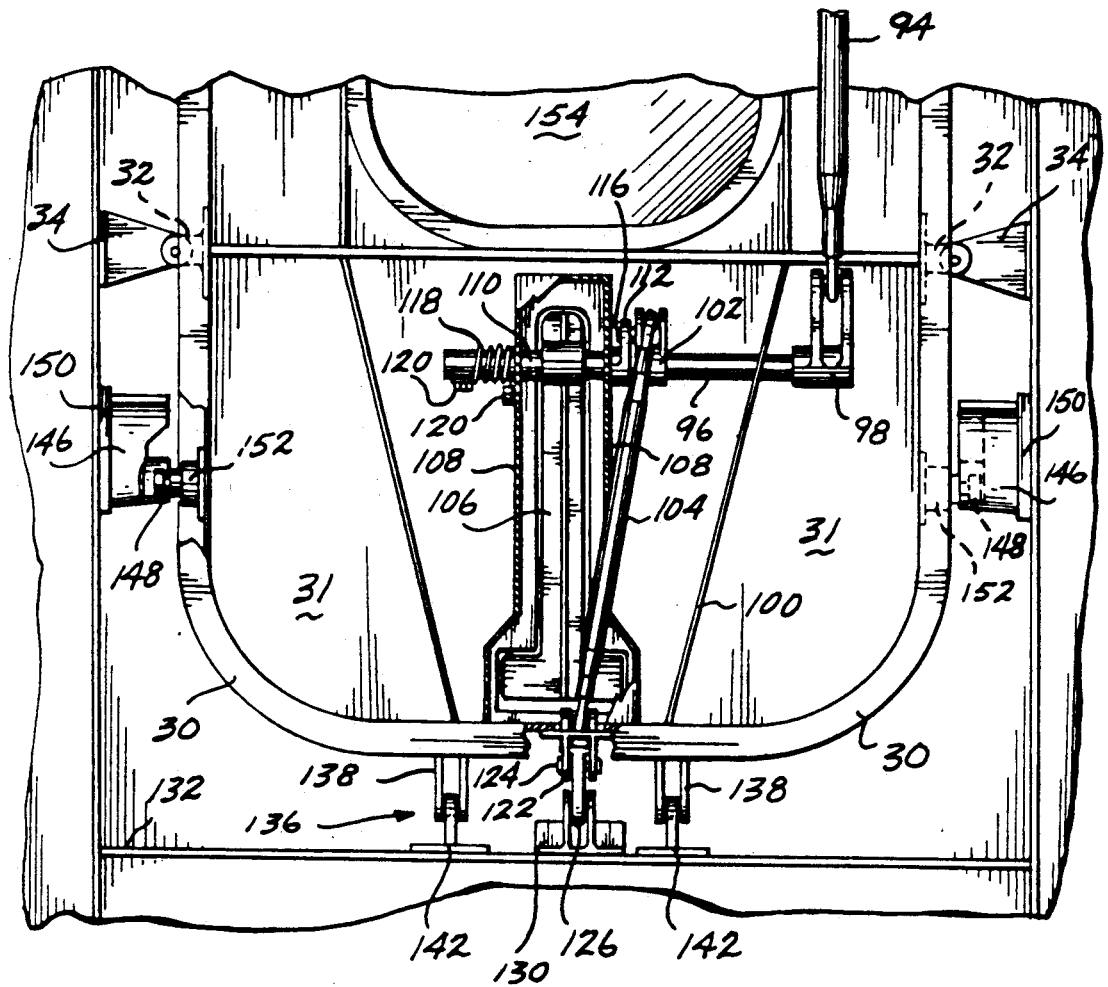
FIG. 4 is an elevational front view of the lower portion of the hatch shown in FIG. 2, partially cut away to more clearly show details of the hatch components.

The latching mechanism that prevents movement of hatch 10 is best understood by reference to FIGS. 4, 5, 8, and 10. This mechanism includes a latch bracket 122, which is mounted to the bottom surface of peripheral flange 26. Latch bracket 122 is of double-flange design, having a pin 124 extending between the two flanges. The latching mechanism also includes a generally V-shaped latch 126 pivotally attached at one end to pushrod 104 and pivotally attached at its elbow region to pin 124 of latch bracket 122. The other end of latch 126 is of a hook configuration designed to engage a pin 128 of a receiving bracket 130. Receiving bracket 130 is also of double-flange and pin design, and is mounted at the junction of the outer skin 18 and a lower sill 132 of opening 12. As illustrated, an opening 134 is formed in peripheral flange 26 that allows the required movement of the end of latch 126 pivotally attached to pushrod 104. As pushrod 104 is extended in a downward position, the generally V-shaped latch 126 is caused to rotate about pin 124, in turn causing the hooked portion of latch 126 to disengage pin 128 of receiving bracket 130. Referring to FIG. 4, it is illustrated that the latching mechanism is slightly offset toward pushrod 104 from the longitudinal centerline of the hatch 10.

Figure 7:
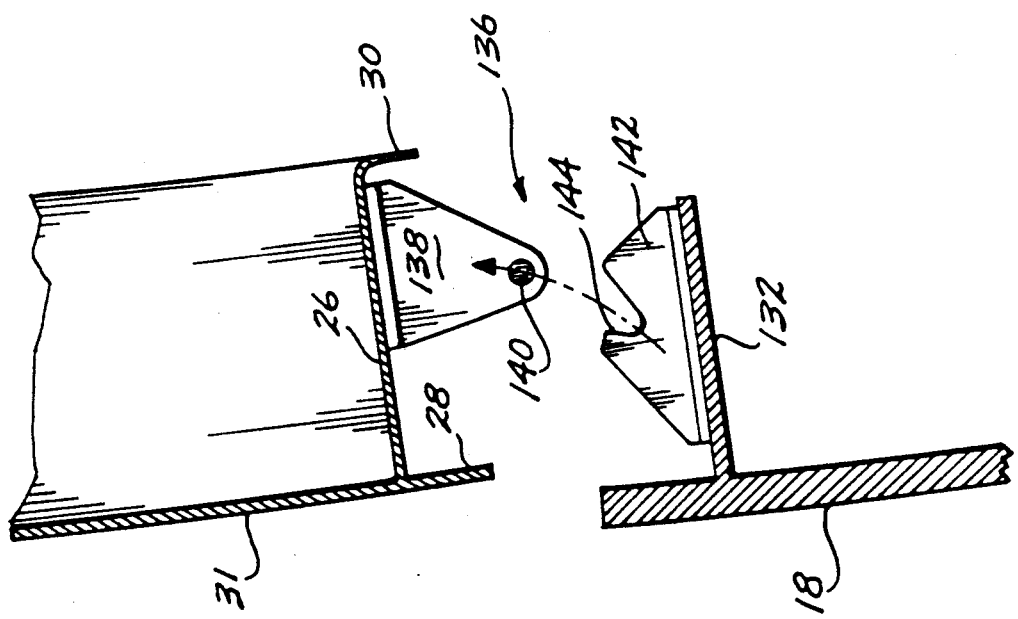
FIG. 7 is a schematic side view of the bottom stop shown in FIG. 6 when the hatch is in its intermediate lifted position.
Figure 6:
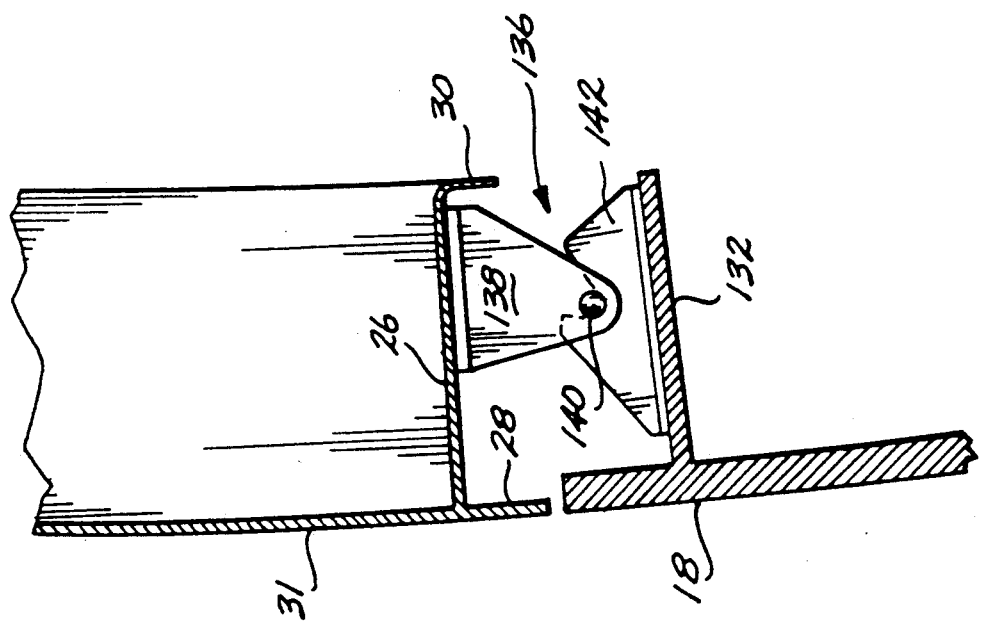
FIG. 6 is a schematic side view of a bottom stop when the hatch is in its closed position.

The hatch 10 further includes a pair of bottom stops 136 located just forward and aft of the above-described latching mechanism. Each bottom stop 136 includes a double-flange bracket 138 mounted to the bottom of peripheral flange 26 and a cylindrical pin 140 extending between the flanges. Each bottom stop 136 also includes a receiving flange 142 mounted to lower sill 132. Receiving flange 142 has an abutment surface 144 (shown most clearly in FIGS. 6 and 7) against which pin 140 rests when the hatch 10 is in its closed position. In this manner, the lower portion of the hatch is prevented from outboard movement beyond a position dictated by the placement of abutment surface 144. As a result, bottom stops 136 are additive in effect to stop pins 32 and stop pads 34. As illustrated, it will be appreciated that the surface of receiving flange 142 opposite abutment surface 144 is sloped away to allow inward and upward movement of the lower portion of hatch 10 upon actuation of either internal handle 62 of external handle 106.

Desired motion of the lower portion of hatch 10 is directed, or guided, through a pair of channels 146 and a corresponding pair of rollers 148 (refer to FIGS. 2 and 4). Channel 146 is attached to, or integral with, a baseplate 150 mounted to the sides of opening 12. Roller 148 is rotatably mounted to a roller support 152, which is fixedly mounted to the side of peripheral flange 26. Each channel 146 has a closed end and an open end, and an intermediate passageway designed to cooperatively engage roller 148. The passageway is configured so that the motion of the lower portion of hatch 10 is initially inward and upward, then outward until roller 148 has cleared the open end of channel 146 and the hatch is free to proceed to its full upward and outward canopy position (see position shown in phantom in FIG. 5).

A transparent window 154 is mounted in the central region of hatch 10 to provide an unobstructed view between the interior and the exterior of the aircraft. Preferably, the vertical and horizontal cross members of the lattice structure of hatch frame 24 form the window forging required to keep transparent window 154 in its mounted position. However, any conventional window mounting may be employed. Additionally, conventional sealing techniques may be used to provide a secure seal around transparent window 154. Because of the configuration of the components of hatch 10, the transparent window 154 may be of standard airplane window dimensions. This standardization of window size is of significant aesthetic consequence to airplane designers. While not explicitly shown, it should be understood that the interior liner for hatch 10 must contain an opening placed and configured to substantially meet the dimensions of transparent window 154.

Referring to FIGS. 1 and 5, it will be appreciated that the components of hatch 10 are substantially disposed within the space defined by the outer skin 18 of the aircraft and the interior cabin liner 20. Because the components fit within this relatively narrow space, passenger headroom over the outboard seats of the aircraft is not violated. Additionally, the protuberances 60 of hinge arms 36, the rods 58, and the compression springs 50 also lie within the space defined by outer skin 18 and interior cabin liner 20. Because this is true, the volume within overhead storage bins 22 is also not violated. As shown in FIG. 5, it is internal handle 62 only that extends inboard beyond interior cabin liner 20.

Figure 8:
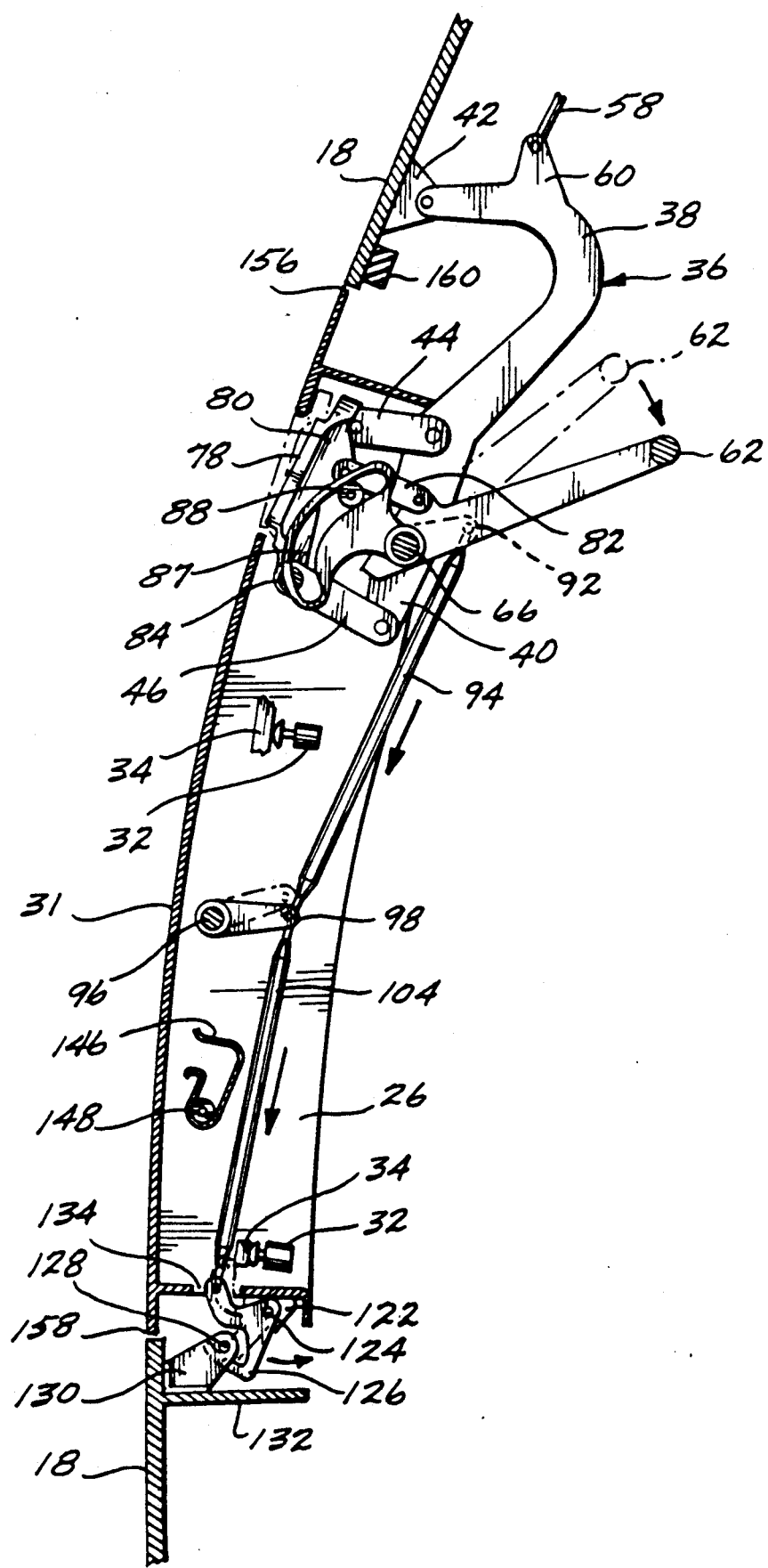
FIG. 8 is a condensed schematic side view of the hatch, showing the configuration of primary hatch components after triggering movement of either the internal handle or the external handle.
Figure 9:
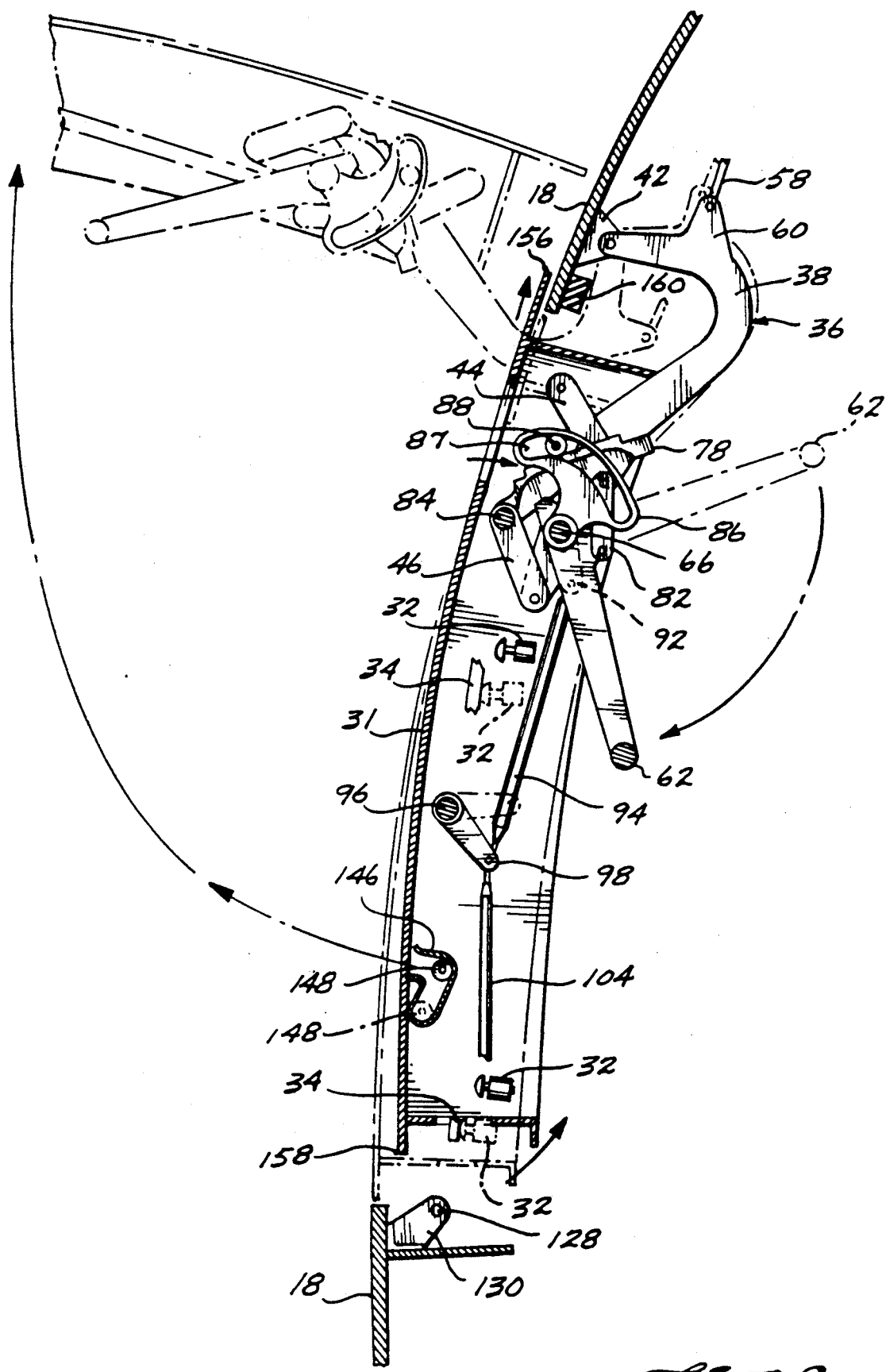
FIG. 9 is a view similar to FIG. 8, showing the configuration of primary hatch components after full rotation of either the internal handle or the external handle.

Movement of hatch 10 through actuation of internal handle 62 is best understood by reference to schematic FIGS. 8 and 9. Referring to FIG. 8, internal handle 62 is pulled downwardly from its initial position, shown in phantom, through a dwell period to the position shown in solid lines. This triggering movement of internal handle 62 through the dwell period causes rotation of lifting upper torque tube 66, in turn causing rotation of lifting cams 86 which are fixedly attached to the upper torque tube through caps 72. During triggering movement, each lifting cam 86 moves from a position where the uppermost terminus of its internal channel 87 is contacting roller 88 to the position shown in FIG. 8. Because the initial portion of the channel 87 is straight, a dwell period is created such that no upward lifting bias occurs and hatch 10 remains in its closed position. Simultaneously with the movement of lifting cam 86, pressure relief vent 78 is pulled inwardly by link 82 in order to equalize the pressure between the interior and the exterior of the aircraft. However, it should be noted that when the pressure differential between the interior and exterior is significant, such as when the aircraft is at cruising altitude, it is impossible for a passenger to apply enough downward force to internal handle 62 to open pressure relief vent 78. Thus, accidental opening of hatch 10 during flight is not a concern.

Triggering movement of internal handle 62 through the dwell period also causes hatch 10 to change from a closed and locked condition to a closed and unlocked condition. As internal handle 62 is pulled downwardly from its initial position to the position shown in solid lines in FIG. 8, crank 92 rotates to cause downward motion of pushrod 94. This downward motion is translated through crank 98, shaft 96, and crank 102 (see FIG. 4) into downward motion of pushrod 104, which in turn causes latch 126 to rotate about pin 124 and thereby move the hook portion of the latch out of engagement with pin 128 of receiving bracket 130. The resultant effect is that hatch 10 has become unlocked. However, hatch 10 and its remaining components have remained in a static position.

As internal handle 62 is moved downwardly beyond the dwell period described above, movement of hatch 10 does occur. Full rotation of the internal handle, as shown in FIG. 9, results in the hatch being moved from its closed position to an intermediate lifted position. In FIG. 9, lines corresponding to hatch 10 being in its closed position are shown in phantom, whereas lines corresponding to hatch 10 being in its intermediate lifted position are shown in solid line. This full downward rotation of internal handle 62 has caused the curved inner surface of the internal channel 87 of lifting cam 86 to bear against roller 88 (which is fixed relative to the hatch frame 24), thus providing the lifting force to hatch 10. A leading edge 156 of the outboard wall 31 of hatch frame 24 has moved in an upward and slightly outboard direction, and a trailing edge 158 of the same has moved upwardly and significantly inboard, as full rotation of internal handle 62 occurs. It should be noted that the amount of inboard movement is greatest at the bottom of hatch 10 and diminishes moving in an upward direction along the hatch. As shown, the upper portion of pressure relief vent 78 has been pulled significantly more inward, and upper lifting links 44 and lower lifting links 46 have drastically changed orientation, from when hatch 10 was in the closed position shown in FIG. 8.

Full rotation of internal handle 62 also causes stop pins 32 to move inwardly and upwardly away from stop pads 34. As previously mentioned, not as much inward movement occurs with the upper stop pins as does with the lower stop pins. However, in either case, sufficient clearance from the stop pads is provided. Full rotation of internal handle 62, and the corresponding movement of hatch 10 from its closed position to its intermediate lifted position, also causes rollers 148 to move upwardly and inwardly along channels 146. Referring to FIG. 9, this corresponds to the movement of roller 148 from the position shown in phantom to the position shown in solid line. Thus, when hatch 10 has reached its intermediate lifted position, rollers 148 are free to move outwardly through the open end of channels 146, and stop pins 32 have adequately cleared stop pads 34.

With the assistance of the force provided by compression springs 50, hatch 10 automatically moves outwardly and upwardly from its intermediate lifted position to its fully open canopy position shown in phantom in FIGS. 5 and 9. The force provided by compression springs 50 gradually increases as internal handle 62 is rotated downwardly, because the protuberance 60 of arcuate portion 38 of hinge arms 36 moves to a position that allows full release of the compression springs. In FIG. 9, this corresponds to the movement of protuberance 60 from the position shown in phantom to the over-top-dead-center position shown in solid line. While not shown, compression springs 50 contain snubbers to ensure the controlled movement of hatch 10 upward and outward. A pair of bumpers 160 are mounted to the inside surface of outer skin 18 adjacent opening 12. Each bumper engages the arcuate portion 38 of hinge arm 36 when hatch 10 is in its fully upward and outward open position to prevent structural damage to outer skin 18 caused by overrotation of the hinge arms.

Figure 10:
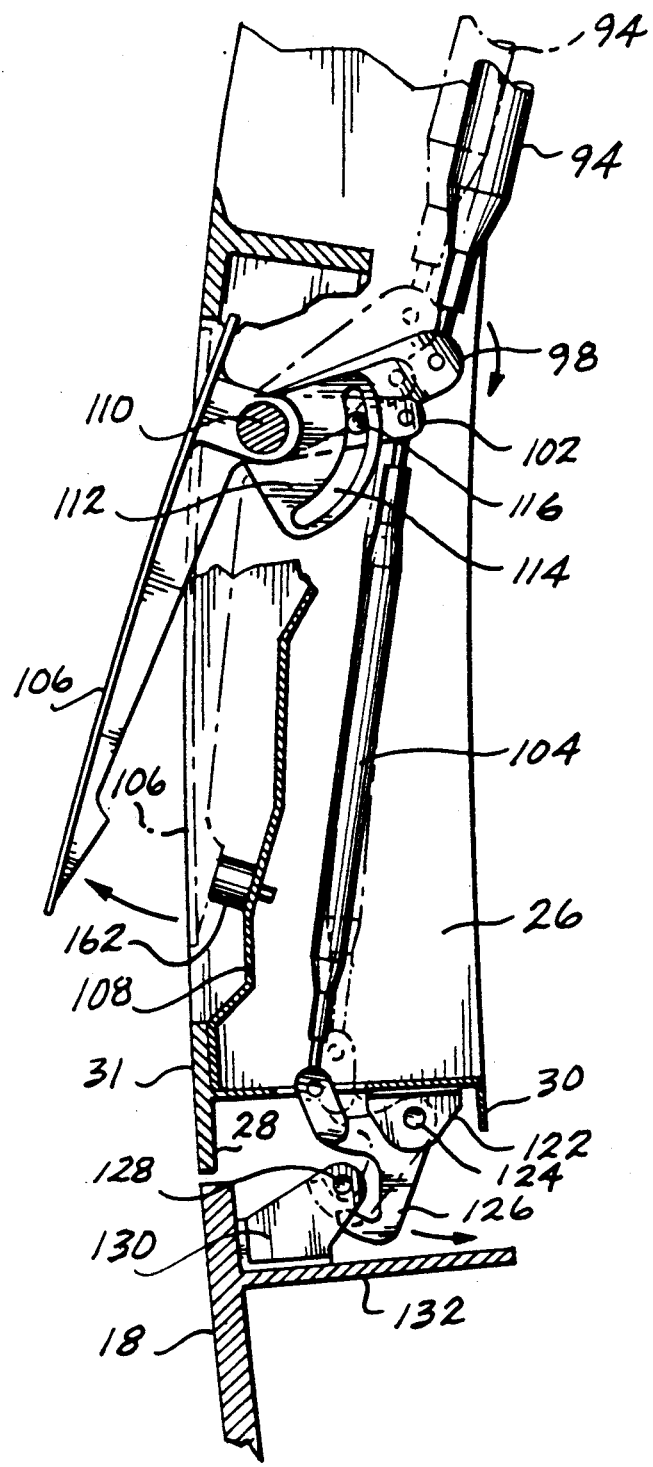
FIG. 10 is a schematic side view of the lower portion of the hatch, showing the configuration of primary hatch components after triggering movement of the external handle.
Figure 11:
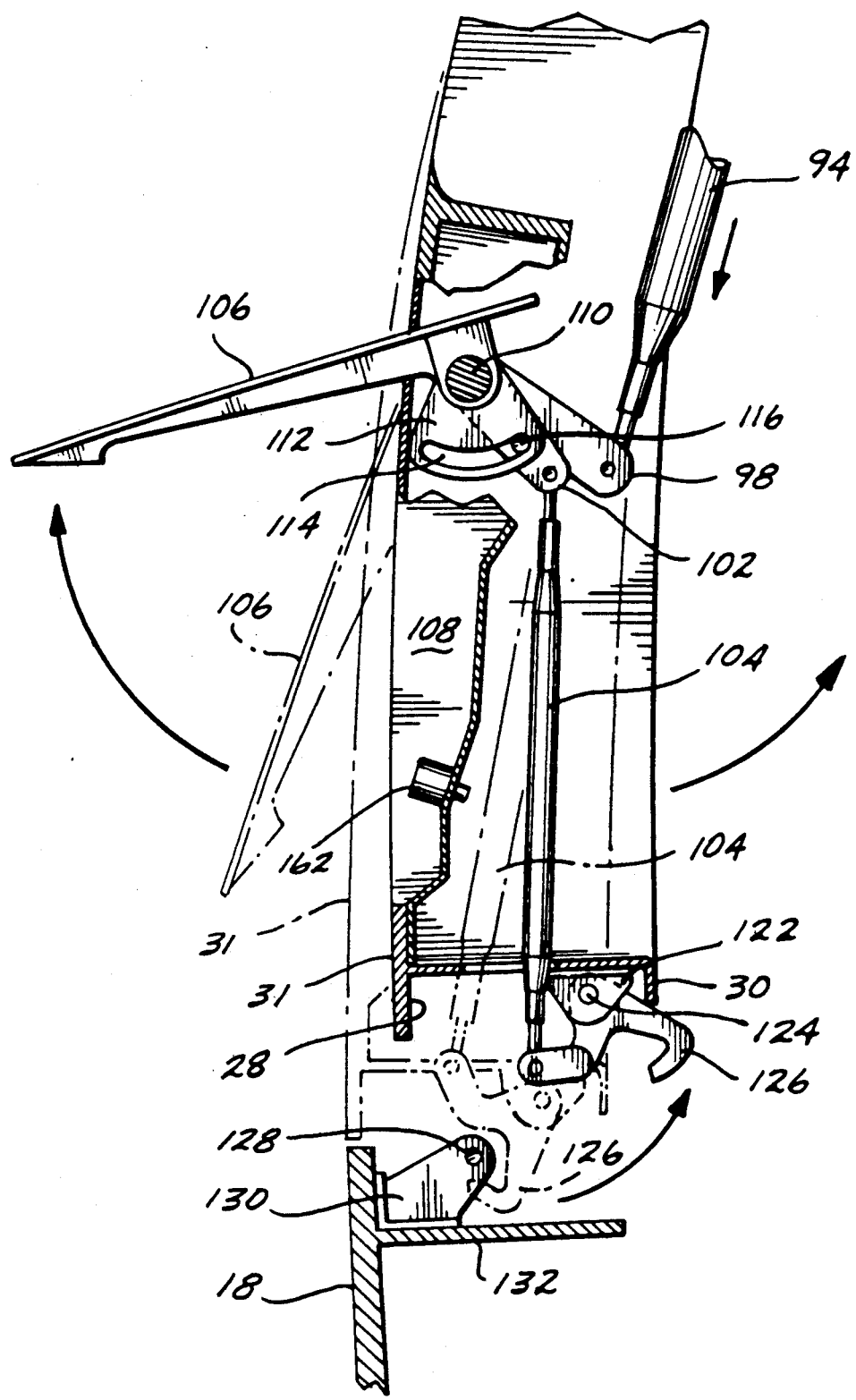
FIG. 11 is a view similar to FIG. 10, showing the configuration of primary hatch components after full rotation of the external handle.

Movement of hatch 10 through actuation of external handle 106 is best understood by reference to schematic FIGS. 10 and 11. In its nonactuated position, shown in phantom in FIG. 10, external handle 106 is biased inwardly by helical torsion spring 118, as described above. The end of external handle 106 located distal from shaft 110 rests against a bumper 162, which is mounted to housing 108. Bumper 162 is sized and positioned such that the outward edge of external handle 106 blends in a planar manner with the outboard wall 31 of the hatch frame 24.

Just as does internal handle 62, external handle 106 also has a dwell period. Referring to FIG. 10, the location of components when external handle 106 is in its nonactuated position are shown in phantom, whereas components are shown in solid line at the location they would have when external handle 106 has been rotated outwardly to the end of the dwell period. Pulling external handle 106 outwardly through the dwell period causes shaft 110 to rotate, thereby resulting in downward rotation of lost motion device 112. Downward rotation of lost motion device 112 causes similar rotation of crank 102 because the uppermost terminal end of channel 114 immediately engages pin 116 of crank 102.

Downward rotation of crank 102 results in downwardly rotation of crank 98, due to interconnecting shaft 96 (refer to FIG. 4). As crank 98 is rotated downwardly, pushrod 94 moves in a downward direction as well. Operating through crank 92, this downward movement of pushrod 94 is translated into rotation of upper torque tube 66 (refer to FIG. 3). Rotation of the upper torque tube causes internal handle 62 to move in a downward position through its dwell period, thereby causing rotation of lifting cams 86 and disengagement of pressure relief vent 78 to provide equalization of pressure between the interior and exterior of the aircraft. Thus, movement of external handle 106 through its dwell period results in the exact same movements of the components in the upper region of hatch 10 as when internal handle 62 is independently moved through its dwell period.

Downward rotation of crank 102, prompted by the movement of external handle 106 through its dwell period, also causes downward movement of pushrod 104, which results in hatch 10 being unlocked in the same manner as described above for internal handle 62. Namely, downward movement of pushrod 104 causes latch 126 to rotate about pin 124 such that the hooked portion of the latch moves out of engagement with pin 128 of receiving bracket 130.

FIG. 11 illustrates the orientation of components upon the movement of external handle 106 from a position marking the end of its dwell period (shown in phantom) to its fully actuated position (shown in solid line). Full outward rotation of external handle 106 leads to further downward movement of pushrod 104, thereby causing further rotation of latch 126 about pin 124. This additional rotation of the latch 126 serves no practical purpose, as the latch has been fully disengaged by the time external handle 106 has moved through its dwell period. However, full rotation of external handle 106 also results in further downward movement of pushrod 94, which has an operative effect on the components in the upper region of hatch 10. In essence, full rotation of external handle 106 causes reconfiguration of the components in the upper portion of the hatch in a manner identical to that shown in FIG. 9, which represents the effect of full rotation of internal handle 62. FIG. 11 also clearly shows that the lower portion of hatch 10 has moved to a position identical to that shown in FIG. 9. Thus, stop pins 32 have cleared stop pads 34, and rollers 148 have reached the upper portion of channels 146, thereby allowing automatic movement of hatch 10, through force supplied by compression springs 50, to its fully upward and outward open position (shown in phantom in FIGS. 5 and 9).

It should be understood that there are state-of-the-art mechanisms commonly employed in existing hatches that have not been illustrated for the sake of simplicity and clarity. However, such mechanisms could be easily retrofitted to the present invention. Examples of such mechanisms are: a flight lock mechanism (as required by FAA regulations) that serves as a secondary backup to prevent the hatch from inadvertent opening during unpressurized flight; and a hold-open mechanism capable of securely holding the hatch in an open position.

While a preferred embodiment of the present invention has been illustrated and described, it should be understood that variations can be made therein without departing from the spirit and scope of the invention. Accordingly, it is to be understood that the invention is not to be limited to the specific embodiment illustrated and described. Rather, the true scope and spirit of the invention is to be determined by reference to the following claims.

The embodiments of the invention in which an exclusive property or privilege is claimed are defined as follows:

1. A hatch assembly for closing an opening formed in the body of an aircraft having an outer skin and an interior cabin liner, the hatch assembly comprising:
   a hatch;
   hinge means for pivotally attaching said hatch to the body to provide swinging movement of said hatch between a first position, in which said hatch lies within the opening, and a second position, in which said hatch is spaced above and outboard of the opening;
   stop means associated with said hatch and the aircraft, said stop means preventing outboard movement of said hatch from said first position;
   drive means coupled in driving relationship to said hinge means for driving said hatch from said first position slightly inward and upward to an intermediate lifted position to clear said stop means and then outward to said second position;
   latch means associated with said hatch and the aircraft, said latch means being operable when said hatch is in said first position to place said hatch in a latched condition in which movement of said hatch from said first position is prevented; and actuation means operably coupled to said latch means so that triggering movement of said actuation means disengages said latch means to place said hatch in an unlatched condition, said actuation means further being operably coupled to said drive means so that further movement of said actuation means engages said drive means to provide movement of said hatch to said intermediate and second positions;

wherein said hinge means, stop means, drive means, latch means, and actuation means are disposed substantially within a space defined by the outer skin of the aircraft and the interior cabin liner.

2. The hatch assembly of claim 1, wherein said hinge means comprises a hinge arm having an arcuate portion and a base portion, said arcuate portion having a first end distal from said base portion pivotally mounted to the body of the aircraft, said arcuate portion further being attached to said drive means at a position intermediate said first end and said base portion, said base portion being translationally mounted to said hatch substantially at both ends of said base portion.

3. The hatch assembly of claim 2, wherein said arcuate portion has a curvature designed to provide movement of said hatch in an arc between said intermediate and second positions.

4. The hatch assembly of claim 1, wherein said drive means comprises a compression spring means disposed above the opening and coupled to said hinge means for biasing said hatch from said first position to said intermediate lifted position and from said intermediate lifted position to said second position.

5. The hatch assembly of claim 1, wherein said stop means comprises:
stop pins spaced about the periphery of said hatch; and
stop pads spaced about the periphery of the opening and cooperatively associated with said stop pins when said hatch is in said first position to prevent outboard movement of said hatch.

6. The hatch assembly of claim 1, wherein said actuation means comprises an internal handle pivotally attached to said hinge means and an external handle operatively connected to said internal handle, each handle being independently capable of disengaging said latch means and engaging said drive means.

7. The hatch assembly of claim 6, further comprising a lifting cam attached to said internal handle and sized to receive a roller fixedly attached to said hatch for directing the motion of said hatch between said first position and said intermediate lifted position upon movement of said actuation means.

8. The hatch assembly of claim 1, further comprising pressure-relief means formed in said hatch and operably connected to said actuation means, said pressure-relief means operable upon said triggering movement of said actuation means to equalize the pressure within the aircraft with the pressure outside the aircraft.

9. The hatch assembly of claim 1, further comprising:
guide channels fixedly mounted on opposite sides of the opening; and
guide rollers rotatably mounted on opposite sides of said hatch, said guide rollers cooperatively engaging said guide channels so as to direct the motion of the lower portion of said hatch between said first position and said intermediate lifted position, said guide channels and said guide rollers further allowing free outboard movement of said hatch between said intermediate lifted position and said second position.

10. The hatch assembly of claim 1, further comprising a transparent window mounted in said hatch, wherein said hinge means, stop means, drive means, latch means, and actuation means are arranged around said window such that an unobstructed view through said window is provided.

11. A mounting assembly for a plug-type aircraft hatch for moving the hatch between a closed position in an opening formed in the body of an aircraft and an open position, the aircraft having an outer skin and an interior cabin liner having at least one stop against which a cooperating arm on the hatch rests when the hatch is in the closed position to prevent blowout of the hatch when the interior of the aircraft is pressurized, the mounting assembly comprising;

hinge means operably associated with the aircraft and the hatch for mounting the hatch for swinging movement between a closed position, in which the hatch lies within the opening, and an open position, in which the hatch is spaced outboard from and adjacent the top of the opening;

drive means coupled in driving relationship between said hinge means and the hatch for driving the hatch inward and upward from said closed position to an intermediate lifted position in which the cooperating arm is deregistered from the stop as said hinge means begins to swing the hatch to said intermediate lifted position so that the hatch can thereafter swing to said open position;

lever means operatively coupled between said hinge means and said drive means for actuating the same to open and close the hatch; and latch means cooperating between the hatch and the aircraft for locking the hatch in said closed position, said latch means being operatively coupled to said lever means to move said latch means from a locked to an unlocked condition by triggering movement of said lever means prior to actuation of said hinge means and said drive means;

wherein said hinge means, drive means, lever means, and latch means are disposed substantially within a space defined by the outer skin of the aircraft and the interior cabin liner.

12. A hatch assembly for closing an opening formed in the body of an aircraft, the hatch assembly comprising:
a hatch;
hinge means for pivotally attaching said hatch to the body to provide swinging movement of said hatch between a first position, in which said hatch lies within the opening, and a second position, in which said hatch is spaced above and outboard of the opening;
stop means associated with said hatch and the aircraft, said stop means preventing outboard movement of said hatch from said first position;
compression spring means disposed above the opening and coupled in driving relationship to said hinge means for driving said hatch from said first position slightly inward and upward to an intermediate lifted position to clear said stop means and then outward to said second position;
latch means associated with said hatch and the aircraft, said latch means being operable when said hatch is in said first position to place said hatch in a latched condition in which movement of said hatch from said first position is prevented; and actuation means operably coupled to said latch means so that triggering movement of said actuation means disengages said latch means to place said hatch in an unlatched condition, said actuation means further being operably coupled to said compression spring means so that further movement of said actuation means engages said compression spring means to provide movement of said hatch to said intermediate and second positions.

13. A hatch assembly for closing an opening formed in the body of an aircraft, the hatch assembly comprising:

a hatch;

hinge means for pivotally attaching said hatch to the body to provide swinging movement of said hatch between a first position, in which said hatch lies within the opening, and a second position, in which said hatch is spaced above and outboard of the opening;

stop means associated with said hatch and the aircraft, said stop means preventing outboard movement of said hatch from said first position;

drive means coupled in driving relationship to said hinge means for driving said hatch from said first position slightly inward and upward to an intermediate lifted position to clear said stop means and then outward to said second position;

latch means associated with said hatch and the aircraft, said latch means being operable when said hatch is in said first position to place said hatch in a latched condition in which movement of said hatch from said first position is prevented;

an internal handle pivotally attached to said hinge means;

an external handle operatively connected to said internal handle, wherein each of said handles is operably coupled to said latch means so that triggering movement of either of said handles disengages said latch means to place said hatch in an unlatched condition, each of said handles further being operably coupled to said drive means so that further movement of either of said handles engages said drive means to provide movement of said hatch to said intermediate and second positions; and a lifting cam attached to said internal handle and sized to receive a roller fixedly attached to said hatch for directing the motion of said hatch between said first position and said intermediate lifted position upon movement of either of said handles.

* * * * *

UNITED STATES PATENT AND TRADEMARK OFFICE
CERTIFICATE OF CORRECTION

PATENT NO. : 5,031,863
DATED : July 16, 1991
INVENTOR(S) : D. R. Noble It is certified that error appears in the above-identified patent and that said Letters Patent is hereby corrected as shown below:

| TITLE PAGE | LINE | |
|---|---|---|
| [57] Abstract | 9 & 10 | "external (106)" should read --external handle (106)-- |

Signed and Sealed this

Sixteenth Day of March, 1993

*Attest:*

STEPHEN G. KUNIN

*Attesting Officer*     *Acting Commissioner of Patents and Trademarks*